J. G. KIRKPATRICK.
SECURING DEVICE FOR ICE CREAM FREEZERS.
APPLICATION FILED JUNE 23, 1908.
951,007.
Patented Mar. 1, 1910.
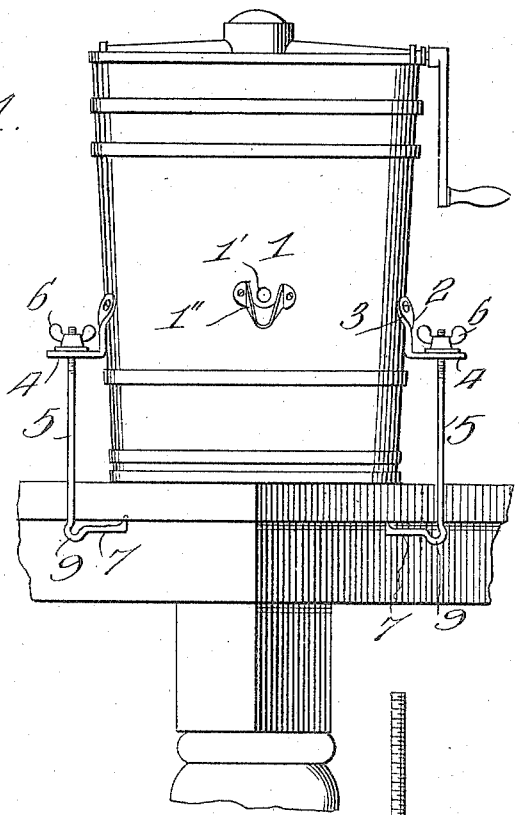
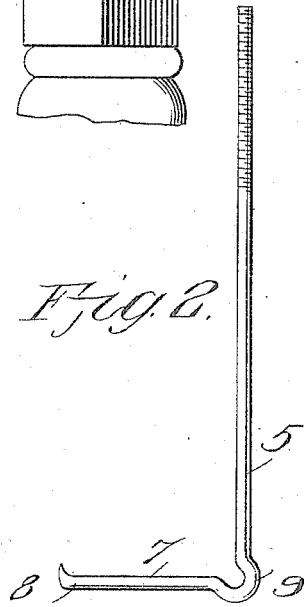

UNITED STATES PATENT OFFICE.

JOHN G. KIRKPATRICK, OF PRESCOTT, ARIZONA TERRITORY.

SECURING DEVICE FOR ICE-CREAM FREEZERS.

951,007.

Specification of Letters Patent.   Patented Mar. 1, 1910.

Application filed June 23, 1908. Serial No. 440,148.

*To all whom it may concern:*

Be it known that I, JOHN G. KIRKPATRICK, a citizen of the United States, residing at Prescott, in the county of Yavapai and Territory of Arizona, have invented new and useful Improvements in Freezer-Holders, of which the following is a specification.

This invention relates to securing devices for ice cream freezers or the like, and the object of the invention is to provide a simple, cheap and effective device which will rigidly retain a freezer or the like upon a table or floor while being operated.

To these ends the invention resides in the novel construction of elements and their arrangement in operative combination hereinafter fully described and claimed.

In the accompanying drawings, Figure 1 is a side elevation of an ice cream freezer provided with the improvements and illustrating the same securely retained upon a support. Fig. 2 is an enlarged side elevation of the engaging element.

In Fig. 1 of the drawings the improved holding device is illustrated in applied position upon an ice cream freezer, but it is to be understood that the improvement is not restricted to apparatus of this character as it may be applied with equal efficiency to other receptacles or devices.

Referring particularly to Figs. 1 and 2 of the drawings the numeral 1 designates an ordinary ice cream freezer. This freezer 1 is provided with a drain hole 1' positioned upon the side of the receptacle at a point approximately just below the top of the inner vessel, and this drain hole is provided with a downwardly inclined outwardly projecting spout 1'' whereby the water may be drawn from the interior of the receptacle without danger of contacting the sides thereof. The freezer is also provided with, preferably, oppositely disposed L-shaped bracket members 2, the vertical arms of which are provided with ears 3 having suitable perforations adapted for the reception of suitable securing elements by which the brackets are retained upon the freezer. The horizontal arm 4 of the bracket is provided with a centrally arranged opening adapted for the reception of the vertical arm 5 of the retaining element. This retaining element has the upper portion of its vertical arm 5 threaded and adapted for engagement by a winged nut 6, by which the arm may be adjusted vertically. The horizontal arm 7 of the element is adapted to extend inwardly beneath the bottom of the freezer 1 and has its outer end upturned and sharpened to provide a tooth 8 which is adapted to be embedded within a support to securely retain the freezer upon a table or the like. At the meeting ends of the vertical arm 5 and the horizontal arm 7 the device is provided with a U-shaped bend or eye 9 adapted for engagement with a suitable staple or hook when the holder is positioned upon a floor to sustain a freezer or the like.

Having thus fully described the invention what is claimed as new is:

An ice cream freezer or the like provided with L-shaped brackets, the horizontal member of the bracket being provided with an opening, L-shaped retaining members, the vertical arms of the retaining members having their upper ends threaded and adapted to pass through the opening of the horizontal arm of the bracket, threaded elements engaging the threaded arms, the vertical and the horizontal arms of the retaining members being provided with a U-shaped offset at their point of juncture and the horizontal arm having its end upturned to provide a tooth.

In testimony whereof I affix my signature in presence of two witnesses.

JOHN G. KIRKPATRICK.

Witnesses:
E. J. F. HORNE,
F. G. BROWN.